United States Patent [19]

Snyder

[11] 4,173,442
[45] Nov. 6, 1979

[54] APPARATUS AND METHOD FOR DETERMINATION OF WAVELENGTH

[75] Inventor: James J. Snyder, Clarksburg, Md.

[73] Assignee: The United States of America as represented by the Secretary of Commerce, Washington, D.C.

[21] Appl. No.: 801,272

[22] Filed: May 27, 1977

[51] Int. Cl.² ............................................. G01B 9/02
[52] U.S. Cl. .................................... 356/346; 356/352
[58] Field of Search .................... 356/106 S, 112, 346, 356/352

[56] References Cited

U.S. PATENT DOCUMENTS

| 2,472,991 | 6/1949 | Sukumlyn | 356/111 X |
| 3,709,610 | 1/1973 | Kruegle | 356/111 X |
| 3,929,398 | 12/1975 | Bates | 356/186 |
| 3,937,580 | 2/1976 | Kasdan | 356/111 X |

Primary Examiner—John K. Corbin
Assistant Examiner—Matthew W. Koren
Attorney, Agent, or Firm—Eugene J. Pawlikowski; Alvin J. Englert

[57] ABSTRACT

An apparatus and method for determining the wavelength of light such as monochromatic radiation from a laser source. The apparatus comprises a Fizeau-type interferometer, photoelectric means for receiving the interference fringe pattern produced in the interferometer, means for determining the spatial period and phase of the fringe pattern, and means for calculating from the spatial period and phase the wavelength of the radiation.

13 Claims, 4 Drawing Figures

Fig. 4.

APPARATUS AND METHOD FOR DETERMINATION OF WAVELENGTH

BACKGROUND OF THE INVENTION

1. Field of the Invention

The invention is in the field of wavelength measuring devices, particularly those devices utilizing interferometers for measuring the wavelength of monochromatic radiation.

2. Description of the Prior Art

Prior art optical fringe counting techniques are known utilizing interferometers of the Michelson type wherein the optical path length is varied by moving an optical carriage containing a reflecting element within the interferometer system. Interferometers of the Fabry-Perot type have also been widely utilized in studies of coherent radiation as is exemplified, for example, by U.S. Pat. No. 3,824,018 to Crane. In the Crane patent, however, it is necessary to rotate the Fabry-Perot etalon through various angles of incidence inasmuch as no spatial interference pattern is formed. Although wavelength measurements may be made using the resulting frequency pattern as a relative measure, the technique requires movement of the etalon and does not utilize both the spatial frequency (period) and phase of the interferometer pattern to provide an accurate measure of wavelength.

SUMMARY OF THE INVENTION

It is an object of the invention to provide a method and apparatus for accurately determining the wavelength of a light beam utilizing a Fizeau interferometer and without requiring the utilization of moving optical components.

It is a further object of the invention to provide a method and apparatus for determining the wavelength of a monochromatic radiation beam by measuring the spatial period and phase of the fringe pattern from a Fizeau-type interferometer.

Yet a further object of the invention is to provide a means for real time monitoring the wavelength of a light source such as a laser to provide a continual readout of the radiation wavelength.

Yet a further object of the invention is to provide a monitor and control apparatus for automatically measuring and controlling the wavelength of a tunable laser.

SUMMARY OF THE DRAWINGS

These and other objects of the invention will become clear in relation to the foregoing description taken in conjunction with the drawings wherein.

DETAILED DESCRIPTION OF THE PREFERRED EMBODIMENT

Figures 1, 2, 3:
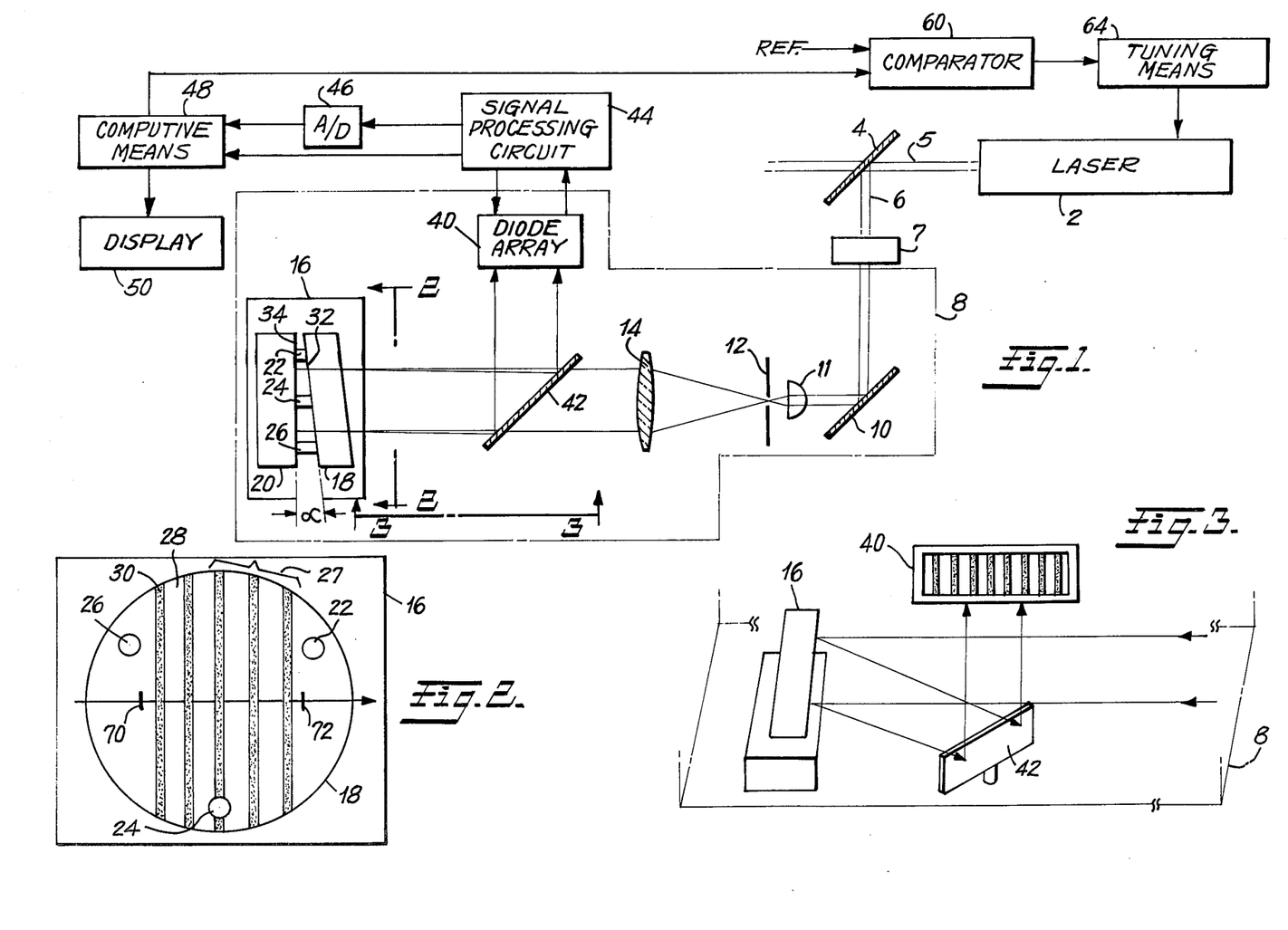
FIG. 1 is a diagramatic plan view of the apparatus in accordance with the invention.
FIG. 2 is a front view of the Fizeau interferometer taken along line 2—2 of FIG. 1.
FIG. 3 is a perspective view of a portion of the wavelength meter taken along line 3—3 of FIG. 1.

FIG. 1 illustrates a block diagramatic view of the wavelength measuring apparatus. The apparatus is utilized to determine the wavelength of a monochromatic source such as, for example, a laser source. The laser may be either pulsed or continuous wave and may be of the tunable type. The wavelength measuring apparatus may be utilized to determine in real time, the wavelength of the light from the laser, and consequently, the apparatus may be utilized as a monitor during the simultaneous use of a laser for other purposes. Consequently, a partially reflecting mirror 4 is positioned to divert a portion 6 of the light beam 5 into the wavelength measuring apparatus through a variable attenuator 7. The wavelength measuring apparatus is contained in a housing 8 which serves to house the various optical elements of the apparatus and isolate the interferometer and photoelectric detector array from extraneous light sources. The portion of the light beam 6 fed into the housing apparatus 8 is directed via a mirror 10 to an objective lens 11, which may be a simple microscope objective, which brings the light beam to a point focus at a small aperture in plate 12 serving as a spatial filter. The aperture may be on the order of 1–10 microns, for example. An achromatic collimating lens 14 is positioned one focal length away from plate 12 and produces a collimated beam directed toward a Fizeau interferometer 16. The Fizeau interferometer comprises two optically-flat plates 18 and 20 which are spaced from one another by means of a plurality of spacers 22–26. Spacers 22–26 provide a wedge angle and gap between the plates 18 and 20. The angle of the wedge is designated $\alpha$ and may typically be on the order of twenty seconds of arc. The nominal thickness of the gap is 1 millimeter. In FIG. 1, the wedge angle is shown greatly enlarged for purposes of illustration. The plates 18 and 20 may be disk-like as shown in FIG. 2 and fabricated from glass or fused silica. The spacers 22–26 may comprise low expansion glass-ceramic material such as Cer-Vit disk on the order of 1 mm thick and 6 mm in diameter. The gap inbetween the plates 18 and 20 may be simply an air gap or, alternately the interferometer 16 or indeed the entire housing 8 may be evacuated. One may additionally include heating means adjacent the interferometer 16 to reduce temperature variations and resulting dimensional changes.

The fabrication of the Fizeau interferometer 16 may be done using conventional techniques. Preferably, the plates 18 and 20 are made of fused silica having an anti-reflective coating on the non-gap forming surfaces. The plate surfaces which define the gap are uncoated to eliminate optical phase dispersion. The spacers 22–26 are glass soldered to one gap forming plate surface and the assembly is lapped to obtain the desired wedge angle. The angle may be tested using a standard autocollimator. The spacers are then polished to obtain an optically flat surface and are secured by optical contact with the other gap forming plate surface to produce the interferometer 16.

The Fizeau interferometer 16 produces a fringe pattern 27 such as shown in FIG. 2 which is seen to comprise a parallel array of light fringes 28 (maxima) and dark fringes 30 (minima). The fringe pattern 27 is produced by reflections from a back surface 32 of plate 18 and front surface 34 of plate 20. Light reflected from these two surfaces 32 and 34 produce the fringe pattern 27 which is subsequently reflected from the Fizeau interferometer 16 onto a photoelectric detector array 40 via a mirror surface 42. The mirror surface 42 is positioned below the laser beam which is incident on the Fizeau interferometer as best illustrated in FIG. 3. The Fizeau interferometer 16 is tilted such that the fringe pattern is reflected onto the mirror surface 42 and subsequently to the photoelectric detector array 40. The photoelectric detector array 40 serves to provide electrical signals corresponding to the intensity of light at discrete points along the fringe pattern 27. These signals are utilized to calculate the period between the fringes as well as the position of the fringes (phase) relative to an origin or reference point by electronic equipment which is typically housed outside the housing 8 and comprises a signal processing circuit 44, analog-to-digital converter 46 and calculating means 48. The output of the calculating means 48 is fed to a display 50 for readout of the calculated wavelength. Calculating means 48 may also provide the wavelength signals as control signals to a comparator circuit 60 which also receives a reference or desired wavelength signal. The output of the comparator circuit is fed to tuning means 64 for controlling the laser frequency so that an effective feedback tuning capability is provided. The comparator circuit 60 may alternately be implemented by the computing means 48 wherein the reference wavelength is an adjustable input parameter. The tuning means 64 includes D/A conversion means for providing an analog output signal for tuning the laser.

The photoelectric detector 40 may for example comprise a Reticon RL-1024C/17 photodiode array manufactured by Reticon Corporation, Sunnyvale, California. The diode array is essentially a monolithic self-scanning linear photodiode array which comprises 1024 separate elements, each 25.4 micrometers wide and spaced 25.4 micrometers on centers. The array elements may have an aperture length of 0.43 mm although other size apertures may also be employed. Each element or cell consists of a photosensor in parallel with a storage capacitor and is connected through a field effect transistor switch to a common video output line. The plurality of photosensor cells are scanned utilizing shift registers driven by two-phase clocks. The signal processing circuit 44 supplies the two-phase clock signals to the diode array 40 and receives the common video output signal which is amplified using an op amp connected as a current amplifier. The signal processing circuit 44 may comprise for example Model RC-100 and 103 array boards also manufactured by Reticon Corporation. The video output signal from the signal processing circuit 44 is fed to an A/D converter such as, for example, Model ADC-EH8B1 manufactured by Datel Systems, Inc., Canton, Mass. An eight bit digital output signal is provided from the analog-to-digital converter as an input to the computing means 48. A blanking signal which marks the end of a photodiode readout scan is also fed from the signal processing circuit 44 to the computing means 48. The fringe pattern is typically sampled and digitized every 20 milliseconds. The computing means 48 stores the fringe pattern for processing in accordance with the algorithm set forth in FIG. 4. Any number of commonly available minicomputers or microcomputers may be utilized as the computing means 48, and in preferred embodiment, an Interdata 7/16 computer is employed, programmed in accordance with the instructions set forth in Appendix A.

The interference fringes are measured using the photoelectric detector array 40 using, for example, the edge of the first element as the origin or reference point. It is also possible, however, to calculate a reference or origin using, for example, the midpoint between two markings 70 and 72 on the interferometer plate 18. The markings 70 and 72 may be narrow reflective strips placed on the outer surface of plate 18, and the computer software may be used to identify these markings by their narrowness and the saturated output of the associated diode elements. Calculating the origin in this fashion has the advantage of automatically self-calibrating the apparatus in the event of an extraneous mechanical vibration or jarring of the interferometer 16.

It is evident that the lens 14 may be replaced by a mirror and an off-axis optical scheme to eliminate chromatic aberrations. Additionally, the mirror 42 may be simply a beam splitter. Other equivalent optical steering and collimating designs will be evident to those of skill in the art.

Figure 4:
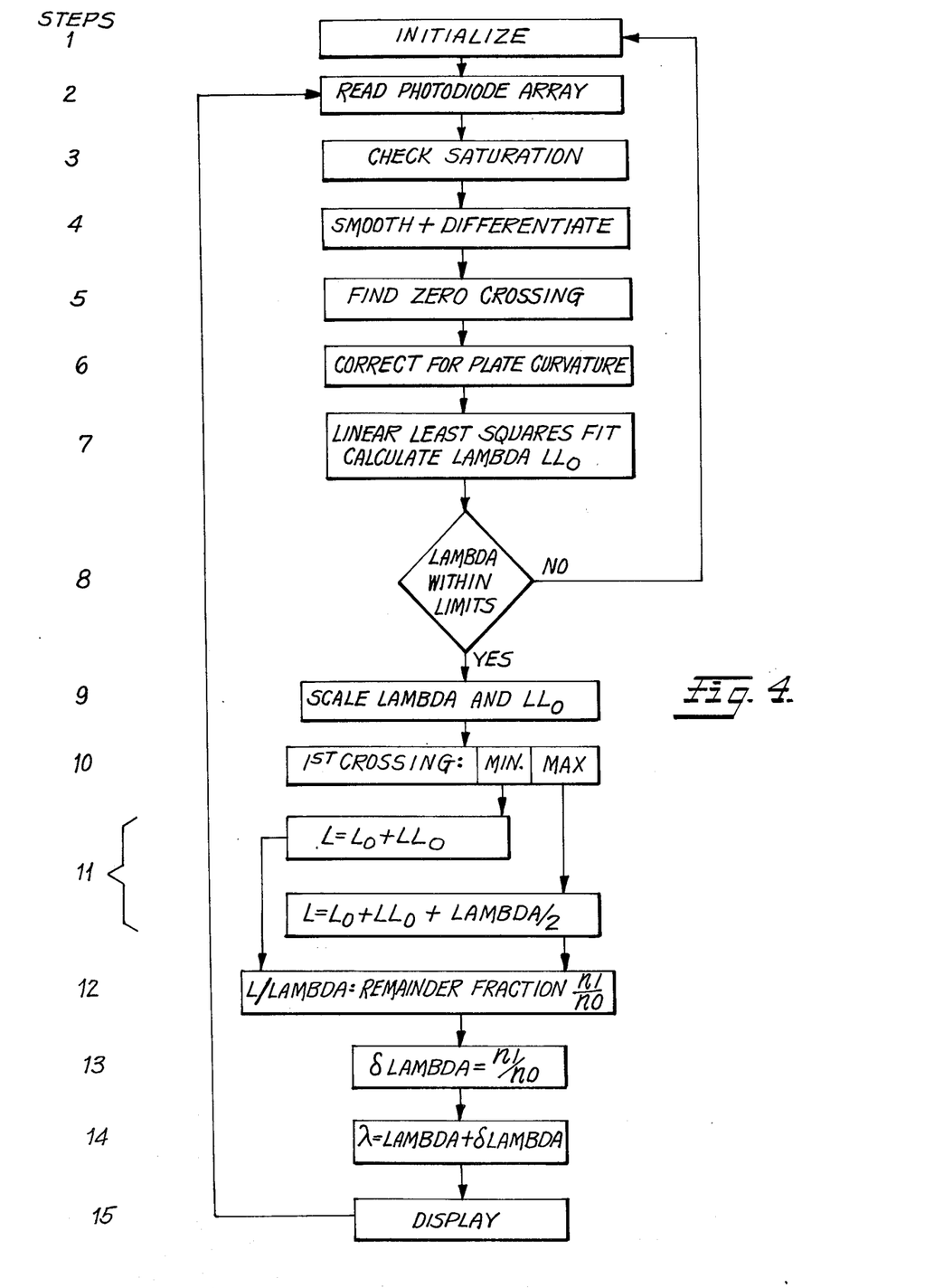
FIG. 4 is a flow chart showing the overall program sequence utilized in the calculating means.

The flow chart showing the overall algorithm of the instruction set of Appendix A is shown in FIG. 4. Step 1 in the flow chart of FIG. 4 is the initialization step which serves to reset and read various computer parameters and load the data reading starting address (address of SELCH) into a designated general purpose register (R3). Data is read into the computer (step 2) upon the occurrence of a blanking signal which is generated by the signal processing circuit 44 at the end of each photodiode array scan. The data is first checked for saturation (step 3) which would occur, for example, if extraneous light enters the housing 8. The saturation check is done by looking at every five consecutive data points to determine if they are all at a maximum count value which is 255 for the eight bit input data word. If saturation does occur a display FFFF is generated by the computing means on display 50 and the program is returned to the restart address RSTR of step 1.

If the input data is not saturated, the computer proceeds to step 4 to smooth and differentiate the received data. The smoothing and differentiating routine is simply a convolution of the raw data with a single period of a symmetrical square wave function of unity amplitude. The zero crossings of the convolution correspond to the maxima and minima of the fringe pattern 27. To find the zero crossing, designated $u_i'$, the computer program interpolates the convolved data to the nearest 1/64 of a photodiode element spacing (step 5). It is recalled that the photodiode array comprises 1024 separate elements. Consequently, the zero crossing points $u_i'$ are simply numbers between 1 and 65536 (1024×64) which represent the locations of the fringe minima and maxima at various points, i, along the photodiode array as measured in units of 1/64 of an element (cell) spacing (25.4 micrometers on center, and 25.4 micrometer wide cells). Nominally, these zero crossings are equally spaced and a plot of $u_i'$ as a function of i should be linear. In practice the plates 18 and 20 will never be completely optically flat and will have a curvature which may be represented by a polynomial function. Step 6 of the program adjusts the zero crossings $u_i'$ to correct for the plate curvature using a polynomial function experimentally determined during initial calibration. The resulting corrected zero crossings designated as $u_i$ are then fit with the most probable straight line fit by the method of least squares as indicated in step 7. The fitting line is given by $u_i = (LAMBDA/2)i + LL_0$. The slope of the straight line fit is half the fringe spacing and is given by:

$$LAMBDA = \frac{2(m\Sigma i u_i - \Sigma i \Sigma u_i)}{m(\Sigma i^2) - (\Sigma i)^2} \quad (1)$$

where $m$ = total number of zero crossings $u_i$
$i = 1, 2, \ldots m$
LAMBDA = fringe spacing The value of $LL_0$ is the most probable position of the calculated zero crossing for $i=0$ and is given by:

$$LL_0 = \frac{2\Sigma u_i - \text{LAMBDA} \, \Sigma \, i}{2m} \quad (2)$$

For a fringe minimum at the calculated $i=0$ crossing the optical interference path difference $L$ is given by:

$$L = L_0 + LL_0 \quad (3)$$

where $L_0$ is the optical path difference at the origin from which $u_i$ is measured, and is a calibration constant of the instrument previously determined using a laser with an accurately known wavelength. $LL_0$, properly scaled, is then simply the change in the optical path difference between that at the origin and that at the calculated zero crossing for $i=0$. If however, there is a fringe maximum at the calculated zero crossing for $i=0$ then the fringe at the calculated zero crossing for $i=1$ must be a minimum. In this event, the optical path difference is given by:

$$L = L_0 + LL_0 + \text{LAMBDA}/2 \quad (4)$$

LAMBDA is a measure of the spatial period of the fringe pattern, which is proportional to the wavelength of the light beam that produces the fringe pattern. When correctly scaled, LAMBDA is thus a first approximation to the wavelength of the light beam being measured. The true value of the wavelength, $\lambda$, is given at the first (or any) fringe minimum strictly by the formula:

$$L = n\lambda \quad (5)$$

where
L = the optical interference path difference at the fringe minimum, and
n = an integer (the interference order number)

The algorighm for calculating $\lambda$ is simply to calculate LAMBDA from equation (1) and L from equation (2) and either equation (3) or (4). The ratio L/LAMBDA will be approximately equal to the order number n, as per equation (5). In practice, however, there will be a remainder after dividing L by LAMBDA and the remainder may be used to correct the first approximation to the wavelength $\lambda$ as described below.

Steps 8-14 of the flow chart of FIG. 4 illustrate the above-described algorithm. To reduce round-off errors, the formulas used in the program to compute LAMBDA and $LL_0$ have been modified slightly from equations (1) and (2). As a result, the units for both LAMBDA and $LL_0$ are 1/128th of the photodiode element spacing. The calculated value of LAMBDA is checked to see if it is within certain limits, namely 66–195 photodiode elements to insure that previous computer steps have resulted in a reasonably correct value of LAMBDA. If LAMBDA is correctly within the acceptable limits, step 9 of the program converts LAMBDA and $LL_0$ to appropriate units using the calibration factor SCALE. This factor SCALE is proportional to the interferometer wedge angle $\alpha$ and is experimentally determined using a laser of known wavelength during initial instrument calibration. Step 10 of the program determines whether the calculated zero crossing $i=0$ corresponds to a minimum or maximum light intensity value. This is done simply by looking at the slope of the zero crossing, i.e. positive slope corresponds to maximum and negative to minimum values. Step 11 of the program thus calculates L using either equation (3) or (4) in combination with equation (2). The value of L is then divided by LAMBDA in step 12. The nearest integral value of the quotient $n_0$ is equal to the interferometer order number. The remainder is designated $n_1$ and the relative remainder defined as $n_1/n_0$ is the correction factor $\delta$LAMBDA which is added to the first approximation LAMBDA to get the wavelength $\lambda$. Step 13 of the program calculates $\delta$LAMBDA $= n_1/n_0$ and step 14 calculates the final value of $\lambda =$ LAMBDA $+ \delta$LAMBDA. The resulting output wavelength is displayed after conversion from binary to decimal form (B/D subroutine) on display means 50 as indicated in step 15. A detailed program listing in accordance with the flow chart of FIG. 4 is given in Appendix A.

In operation, the displayed value of $\lambda$ is updated 10–20 times a second. The instrument has a wavelength range of approximately 400 nm – 1.1 um with possible resolution and accuracy of a few parts in $10^8$. The resolution and accuracy of the apparatus are determined by the phase measurement, somewhat as in the case of a Fabry-Perot interferometer, but the order number ambiguity of the phase measurement is removed by determining the spatial frequency of the fringes. The resulting instrument and method permits an absolute determination of the measured wavelength to an accuracy of a small fraction of the free spectral range of the interferometer.

It is evident that the apparatus of the invention may be utilized for measuring the wavelength of both CW and pulsed lasers. If a pulsed laser is employed it is necessary to sync the pulsing of the laser with the scanning of the linear photodiode array. The "start pulse" from the signal processing circuit 44 may conveniently be used for this purpose.

The apparatus and method of the invention are applicable for visible as well as non-visible light sources. For example, UV and IR sensitive photodiode arrays may be utilized in the disclosed apparatus. Further, it is not necessary to utilize laser radiation inasmuch as image dissecting photomultipliers will allow wavelength measurements of monochromatic non-laser sources. Additionally, modifications of the computer program will allow analysis and measurements of multi-line sources with any of these systems.

APPENDIX A

LAMBDA METER PROGRAM

PROG= LAMBDA    03-066R03M96

```
                                2         ERLST
                                3         CROSS
```

LAMBDA METER PROGRAM

READ IN DATA FROM RETICON

```
                         5    *INITIALIZE INPUT DEVICE AND SELCH
0000R  2412             6  INIT   LIS   1,2              LOAD 2 INTO R1
0002R  C820 3573        7         LHI   2,13683          LOAD MSHW OF L0 AND STORE
0006R  4020 03ACR       8         STH   2,L0
000AR  C820 3887        9         LHI   2,14471          LOAD LSHW OF L0 AND STORE
000ER  4021 03ACR      10         STH   2,L0(1)
0012R  C820 4886       11         LHI   2,18566          LOAD SCALE AND STORE
0016R  4020 03B4R      12         STH   2,SCALE
001AR  C810 4000       13  RSTR   LHI   1,16384          RESTORE LAMBDA TO 16384
001ER  4010 1550R      14         STH   1,LAMBDA
0022R  C810 008C       15  START  LHI   1,X'8C'          LOAD INPUT DEVICE ADR INTO R1
0026R  C820 00E0       16         LHI   2,X'E0'          LOAD DISARM COMMAND INTO R2
002AR  9E12            17         OCR   1,2              DISARM INPUT DEVICE INTERRUPTS
002CR  C830 00F0       18         LHI   3,X'F0'          LOAD SELCH ADR INTO R3
0030R  2448            19         LIS   4,8              LOAD SELCH STOP COMMAND
0032R  9E34            20         OCR   3,4              STOP SELCH
0034R  C840 03B8R      21         LHI   4,DATA           LOAD MEMORY START LOCATION
0038R  9454            22         EXBR  5,4              SWITCH BYTES
003AR  9A35            23         WDR   3,5              WRITE MSB INTO SELCH
003CR  9A34            24         WDR   3,4              WRITE LSB INTO SELCH
003ER  CA40 07FE       25         AHI   4,2046           LOAD MEMORY STOP LOCATION
0042R  9454            26         EXBR  5,4              SWITCH BYTES
0044R  9A35            27         WDR   3,5              WRITE MSB INTO SELCH
0046R  9A34            28         WDR   3,4              WRITE LSB INTO SELCH
0048R  C840 0030       29         LHI   4,X'30'          LOAD GO AND WRITE INTO R4
                        30    *WAIT FOR RETICON BLANK
004CR  9D12            31  NOBSY  SSR   1,2              SENSE INPUT DEVICE STATUS
004ER  2281            32         BNCS  NOBSY            UNTIL DEVICE IS BUSY=BLANK
                        33    *WHEN BLANK OCCURS, START SELCH
0050R  9E34            34         OCR   3,4              START SELCH
0052R  9D34            35  INPUT  SSR   3,4              LOAD DATA FROM INPUT DEVICE
0054R  2081            36         BCS   INPUT            NOT BUSY=FINISHED
```

LAMBDA METER PROGRAM

CHECK RETICON FOR SATURATION

```
0056R  0711            38         XHR   1,1              CLEAR COUNTER
0058R  2422            39         LIS   2,2              LOAD INCREMENT
005AR  C830 07FE       40         LHI   3,2046           LOAD FINAL COUNT
005ER  2445            41         LIS   4,5              MAX OF 5 ADJACENT SAT PTS
0060R  C850 00FF       42         LHI   5,255            SATURATION VALUE
0064R  4891 03B8R      43  LP0    LH    9,DATA(1)        LOAD NEXT POINT INTO R9
0068R  0559            44         CLHR  5,9              IS DATA POINT SATURATED?
006AR  2336            45         BES   SAT              IF YES, GO TO SAT
006CR  2445            46         LIS   4,5              IF NOT, RESET R4
006ER  C110 0064R      47         BXLE  1,LP0            RETURN FOR NEXT POINT
0072R  4300 0090R      48         B     CONT1            IF NOT SAT, GO TO CONT1
0076R  2741            49  SAT    SIS   4,1              DECREMENT R4
0078R  2113            50         BMS   SATDSP           IF NEG, DISPLAY FFFF
007AR  C110 0064R      51         BXLE  1,LP0            IF NOT NEG, RETURN FOR NEXT PT
007ER  C870 FFFF       52  SATDSP LHI   7,X'FFFF'        LOAD FFFF INTO R7
0082R  2411            53         LIS   1,1              FRONT PANEL ADR IS 1
0084R  C830 0080       54         LHI   3,X'80'          NORMAL MODE ON PANEL
0088R  9E13            55         OCR   1,3
008AR  9817            56         WHR   1,7              WRITE FFFF ON PANEL
008CR  4300 001AR      57         B     RSTR             RETURN TO RSTR
```

LAMBDA METER PROGRAM

SMOOTHING AND DIFFERENTIATING ROUTINE

```
0090R  0711            59  CONT1  XHR   1,1              ZERO RESULT
0092R  0722            60         XHR   2,2              ZERO COUNTER
0094R  2432            61         LIS   3,2              LOAD COUNTER INCREMENT
0096R  48C0 1550R      62         LH    12,LAMBDA        LOAD LEAD COUNTER
009AR  90C7            63         SRLS  12,7             DIVIDE BY 128
```

```
009CR  094C                64         LHR    4,12            LOAD LEAD COUNTER
009ER  2742                65         SIS    4,2
                           66  *SUBTRACT THE FIRST (LAMBDA/2) POINTS FROM THE SUM
                           67  *OF THE SECOND (LAMBDA/2) POINTS
00A0R  4812 03B8R          68  LP1    SH     1,DATA(2)
00A4R  4A1C 03B8R          69         AH     1,DATA(12)
00A8R  26C2                70         AIS    12,2            INCREMENT LEAD COUNTER
00AAR  C120 00A0R          71         BXLE   2,LP1           RETURN FOR DATA
00AER  0755                72         XHR    5,5             CLEAR INDEX
00B0R  4010 13B8R          73         STH    1,RSLT1         STORE CURRENT RESULT
00B4R  C840 07FE           74         LHI    4,2046          LOAD FINAL COUNTER VALUE
00B8R  48B0 1550R          75         LH     11,LAMBDA
00BCR  90B7                76         SRLS   11,7
00BER  084B                77         SHR    4,11
00C0R  07BB                78         XHR    11,11           ZERO TRAIL COUNTER
00C2R  4812 03B8R          79  LP3    SH     1,DATA(2)       SUB CENTER POINT TWICE
00C6R  4812 03B8R          80         SH     1,DATA(2)
00CAR  4A1B 03B8R          81         AH     1,DATA(11)      ADD IN TRAILING POINT
00CER  4A1C 03B8R          82         AH     1,DATA(12)      ADD IN LEADING POINT
00D2R  26B2                83         AIS    11,2            INCREMENT TRAIL COUNTER
00D4R  26C2                84         AIS    12,2            INCREMENT LEAD COUNTER
00D6R  08A1                85         LHR    10,1            TEMP STORE RESULT
00D8R  47A5 13B8R          86         XH     10,RSLT1(5)     COMPARE SIGNS
00DCR  2114                87         BMS    CRSNG           BRANCH AHEAD IF DIFFERENT,OR
00DER  4015 13B8R          88         STH    1,RSLT1(5)      STORE NEW CURRENT RESULT
00E2R  2308                89         BS     INCR            JUMP TO END OF LOOP
00E4R  4015 1438R          90  CRSNG  STH    1,RSLT2(5)      STORE FOLLOWING RESULT
00E8R  4025 14B8R          91         STH    2,POS(5)        STORE POSITION
00ECR  2652                92         AIS    5,2             INCREMENT INDEX
00EER  4015 13B8R          93         STH    1,RSLT1(5)      STORE NEW PRECEDING RESULT
00F2R  C120 00C2R          94  INCR   BXLE   2,LP3           RETURN
                           95  *CHECK THAT NUMBER OF ZERO CROSSINGS IS BETWEEN 3 AND 29
00F6R  C550 0006           96         CLHI   5,6             IF NDX<6, RESTORE
00FAR  4280 001AR          97         BL     RSTR
00FER  C550 003C           98         CLHI   5,60            IF 4<NDX<60, CONTINUE
0102R  4380 001AR          99         BNL    RSTR            OTHERWISE RESTORE

LAMBDA METER PROGRAM

FIND THE EXACT ZERO CROSSINGS BY INTERPOLATION 0106R  2432               101         LIS    3,2             LOAD COUNTER INCREMENT
0108R  0722               102         XHR    2,2             ZERO COUNTER
010AR  0845               103         LHR    4,5             LOAD FINAL VALUE COUNTER
010CR  2742               104         SIS    4,2
010ER  4000 03AAR         105         LH     0,A2            LOAD CORRECTION COEF A2
0112R  4872 13B8R         106  LP4    LH     7,RSLT1(2)      LOAD PREC VAL INTO NUM
0116R  48A2 1438R         107         LH     10,RSLT2(2)     LOAD FOL VAL INTO DENOM
011AR  0BA7               108         SHR    10,7            SUBTRACT, DENOM IN R10
011CR  4330 001AR         109         BZ     RSTR            IF DENOM ZERO,GO TO RSTR
0120R  0766               110         XHR    6,6             EXPAND NUMERATOR
0122R  0877               111         LHR    7,7
0124R  2312               112         BFFS   1,2
0126R  2761               113         SIS    6,1
0128R  EF60 0006          114         SLA    6,6             MULT NUMERATOR BY 64
012CR  0D6A               115         DHR    6,10            DIVIDE, QUOT INTO ,7
012ER  4882 14B8R         116         LH     8,POS(2)        LOAD POSITION AND
0132R  9185               117         SLLS   8,5             MULTIPLY BY 32
0134R  0B87               118         SHR    8,7             SUB--EXACT POS IS IN R8
                          119  *CORRECT POS FOR PLATE CURVATURE, ETC
0136R  0878               120         LHR    7,8             LOAD POS INTO R7
0138R  9C68               121         MHUR   6,8             POS**2 IN R6-R7
013AR  0876               122         LHR    7,6             UPPER HALF OF POS**2 IN R7
013CR  9C60               123         MHUR   6,0             MULT BY A2, PROD IN R6-R7
013ER  2668               124         AIS    6,8             ADD IN ROUNDING TERM
0140R  9064               125         SRLS   6,4             DIVIDE BY 16
0142R  0886               126         SHR    8,6             CORRECT POS
0144R  4082 14B8R         127         STH    8,POS(2)        CORRECTED ZERO CROSSINGS IN POS
0148R  C120 0112R         128         BXLE   2,LP4
                          129  *NOTE--SLOPE IS GIVEN BY POLARITY OF RSLT2
                          130  *POSITION IS IN UNITS OF 1/64 RETICON ELEMENT SPACING

LAMBDA METER PROGRAM

LEAST SQUARES ESTIMATE OF LAMBDA

014CR  0722               132         XHR    2,2             ZERO COUNTER
014ER  0766               133         XHR    6,6             ZERO ALL SUMS
0150R  0777               134         XHR    7,7
0152R  0788               135         XHR    8,8
0154R  0799               136         XHR    9,9
0156R  07AA               137         XHR    10,10
0158R  07BB               138         XHR    11,11
```

```
015AR  0755              139          XHR    5,5
015CR  07DD              140          XHR    13,13
                         141   *
                         142   *CALCULATE ALL SUMS
015ER  0802              143   LP5    LHR    0,2                I=1+CTR/2
0160R  9001              144          SRLS   0,1
0162R  2601              145          AIS    0,1
0164R  0A50              146          AHR    5,0                SUM I INTO R5
0166R  49F2 14B8R        147          LH     15,POS(2)          LOAD POSITION
016AR  24E0              148          LIS    14,0
016CR  0A9F              149          AHR    9,15               SUM POS INTO R8-R9
016ER  0E8E              150          ACHR   8,14
0170R  9CE0              151          MHUR   14,0               I*POS
0172R  0A7F              152          AHR    7,15               SUM I*POS INTO R6-R7
0174R  0E6E              153          ACHR   6,14
0176R  08F0              154          LHR    15,0
0178R  24E0              155          LIS    14,0
017AR  9CE0              156          MHUR   14,0               I*I
017CR  0ABF              157          AHR    11,15              SUM I*I INTO R10-R11
017ER  0EAE              158          ACHR   10,14
0180R  C120 015ER        159          BXLE   2,LP5              RETURN
0184R  4080 1538R        160          STH    8,SUM1             STORE SUM POS
0188R  4090 153AR        161          STH    9,SUM1+2
                         162   *NOTE--R0=IMAX=NUMBER OF ZERO CROSSINGS
                         163   *(SUM I)**2
018CR  08D5              164          LHR    13,5               CALCULATE (SUM I)**2 AND
018ER  9CC5              165          MHUR   12,5               STORE IN R12-R13
                         166   *IMAX*SUM(I*POS)
0190R  08F6              167          LHR    15,6               MULTIPLY SUM (I*POS) BY
0192R  9C60              168          MHUR   6,0                IMAX AND STORE IN R6-R7
0194R  9CE0              169          MHUR   14,0
0196R  0A6F              170          AHR    6,15
                         171   *(SUM I)*(SUM POS)
0198R  66F8              172          LHR    15,8               MULTIPLY SUM POS BY SUM I
019AR  0839              173          LHR    3,9                AND STORE IN R2-R3
019CR  9C25              174          MHUR   2,5                SUM POS REMAINS IN R8-R9
019ER  9CE5              175          MHUR   14,5
01A0R  0A2F              176          AHR    2,15
                         177   *IMAX*(SUM I**2)
01A2R  08FA              178          LHR    15,10              MULTIPLY SUM(I**2) BY IMAX
01A4R  9CA0              179          MHUR   10,0               AND STORE IN R10-R11

LAMBDA METER PROGRAM

LEAST SQUARES ESTIMATE OF LAMBDA

01A6R  9CE0              180          MHUR   14,0
01A8R  0AAF              181          AHR    10,15
                         182   *CALCULATE LAMBDA
01AAR  0B73              183          SHR    7,3                NUMERATOR IN R6-R7
01ACR  0F62              184          SCHR   6,2
01AER  EF60 0002         185          SLA    6,2                MUL NUM BY 4
01B2R  0BBD              186          SHR    11,13              DENOM
01B4R  4330 001AR        187          BZ     RSTR               IF DENOM=0, GO TO RSTR
01B8R  D000 1554R        188          STM    0,REGSAV           SAVE ALL REGISTERS
01BCR  07AA              189          XHR    10,10              CLEAR R10
01BER  0788              190          XHR    8,8                CLEAR R8
01C0R  089B              191          LHR    9,11               LOAD DENOM INTO R9
01C2R  EEA0 0001         192          SRA    10,1               DIV DENOM IN R10-R11 BY 2
01C6R  0A7B              193          AHR    7,11               AND ADD TO NUM FOR ROUNDING
01C8R  0E6A              194          ACHR   6,10
01CAR  4100 0372R        195          BAL    0,USDVD            GO TO UNSIGNED DIVIDE ROUTINE
                         196   *NOTE--LAMBDA IS IN R11 IN UNITS OF 1/128 RETICON ELEMENTS
                         197   *
                         198   *CHECK THAT LAMBDA IS WITHIN LIMITS
01CER  C5B0 2134         199          CLHI   11,8500            CHECK LOW LIMIT
01D2R  4280 001AR        200          BC     RSTR               IF LOW, RESTORE
01D6R  C5B0 61A8         201          CLHI   11,25000           CHECK HIGH LIMIT
01DAR  4380 001AR        202          BNC    RSTR               IF HIGH, RESTORE
01DER  40B0 1550R        203          STH    11,LAMBDA          STORE LAMBDA
01E2R  D100 1554R        204          LM     0,REGSAV           RESTORE REGISTERS
01E6R  4870 1550R        205          LH     7,LAMBDA           LOAD LAMBDA INTO R7
                         206   *CALCULATE LL0
01EAR  EF80 0002         207   CONT3  SLA    8,2                4*SUM(POS), STORE IN R8-R9
01EER  9C65              208          MHUR   6,5                LAMBDA*SUM(I), STORE IN R6-R7
01F0R  0B97              209          SHR    9,7                4*SUM(POS)-LAMBDA*SUM(I)
01F2R  0F86              210          SCHR   8,6                STORE NUMERATOR IN R8-R9
01F4R  07EE              211          XHR    14,14              ADD IMAX TO NUMER FOR ROUNDING
01F6R  0A90              212          AHR    9,0
01F8R  0E8E              213          ACHR   8,14               STORE IN R8-R9
01FAR  9101              214          SLLS   0,1                MUL IMAX BY 2
01FCR  4330 001AR        215          BZ     RSTR               IF DENOM=0, GO TO RSTR
0202R  0D80              216          DHR    8,0                QUOT IN R9
0202R  4090 1540R        217          STH    9,LL0              STORE IN LL0
                         218   *NOTE--LL0 IS IN UNITS OF 1/128 RETICON ELEMENTS
```

LAMBDA METER PROGRAM

CALCULATION OF EXACT VALUE OF LAMBDA

```
                          220  *CALCULATE LL0+LAMBDA/2
0206R  4DD0 1550R         221        LH      13,LAMBDA        LOAD LAMBDA INTO R13
020AR  9AD1               222        SRLS    13,1             DIVIDE LAMBDA BY 2
020CR  0ADD               223        AHR     9,13             ADD TO LL0
020ER  4C10 1438R         224        LH      1,RSLT2          CHECK SLOPE OF FIRST ZERO
0212R  2112               225        BMS     STORE            IF NEG, GO TO STORE
0214R  0A9D               226        AHR     9,13             OR ADD ANOTHER LAMBDA/2
                          227  *SCALE TO 256E-4 ANGSTROMS AND ADD TO L0
0216R  4C80 03B4R         228  STORE MH      8,SCALE          MULT LL0+LAMBDA/2 BY SCALE
021AR  07CC               229        XHR     12,12            CLEAR R12
021CR  CA90 0200          230        AHI     9,512            ADD IN ROUNDING TERM
0220R  0E8C               231        ACHR    8,12             ADD IN CARRY
0222R  EE80 000A          232        SRA     8,10             DIVIDE BY 1024
0226R  D1E0 03ACR         233        LM      14,L0            LOAD L0
022AR  0AF9               234        AHR     15,9             ADD L0+LL0+LAMBDA/2
022CR  0EE8               235        ACHR    14,8             L IN R14-R15 IN 256E-4 ANGSTROMS
022ER  D0E0 1544R         236        STM     14,L             STORE IN L
                          237  *SCALE LAMBDA TO 256E-4 ANGSTROMS
0232R  4890 1550R         238        LH      9,LAMBDA         LOAD LAMBDA INTO R9
0236R  4C80 03B4R         239        MH      8,SCALE          MULT BY SCALE, INTO R8-R9
023AR  07AA               240        XHR     10,10            CLEAR R10
023CR  CA90 0200          241        AHI     9,512            ADD IN ROUNDING TERM
0240R  0E8A               242        ACHR    8,10             ADD IN ANY CARRY
0242R  EE80 000A          243        SRA     8,10             DIVIDE BY 1024
                          244  *CALCULATE N0=(L+LAMBDA/2)/LAMBDA AND N1=REMAINDER
0246R  086E               245        LHR     6,14             MOVE L TO R6-R7
0248R  087F               246        LHR     7,15
024AR  4100 0372R         247        BAL     0,USDVD          GO TO UNSIGNED DIVIDE ROUTINE
024ER  40B0 1548R         248        STH     11,N0            STORE QUOT IN N0
0252R  0848               249        LHR     4,8              MOVE LAMBDA INTO R4-R5
0254R  0859               250        LHR     5,9
0256R  EE80 0001          251        SRA     8,1              DIVIDE LAMBDA BY 2
025AR  0879               252        SHR     7,9              SUBTRACT LAMBDA/2 FROM REMAINDER
025CR  0F68               253        SCHR    6,8              REMAINDER IN R6-R7
                          254  *SCALE N1 AND LAMBDA TO UNITS OF .0001 ANGSTROM
025ER  EF60 0008          255        SLA     6,8              MULT N1 BY 256
0262R  EF40 0008          256        SLA     4,8              MULT LAMBDA BY 256
                          257  *CALCULATE DELTA LAMBDA
0266R  4D60 1548R         258        DH      6,N0             DELTA LAMBDA IN R7
026AR  0766               259        XHR     6,6              EXPAND INTO R6-R7
026CR  0877               260        LHR     7,7
026ER  2312               261        BFFS    1,2
0270R  2761               262        SIS     6,1
                          263  *CALCULATE EXACT VALUE OF LAMBDA, CONVERT TO DECIMAL, AND DISPLAY
0272R  0A57               264        AHR     5,7              ADD LAMBDA AND DELTA LAMBDA
0274R  0E46               265        ACHR    4,6              FINAL LAMBDA IN R4-R5
0276R  4100 0298R         266        BAL     11,BTOD          CALL B/D SUB, DEC IN R1-R3
027AR  2461               267        LIS     6,1              R6 CONTAINS PANEL ADDRESS
027CR  C870 0040          268        LHI     7,X'40'
0280R  9E67               269        OCR     6,7              DISPLAY IN INCREMENTAL MODE
0282R  9433               270        EXBR    3,3              SWITCH BYTES IN LSHW
0284R  9863               271        WHR     6,3              OUTPUT LSHW
0286R  9433               272        EXBR    3,3              RETURN BYTES TO NORMAL
0288R  9422               273        EXBR    2,2              SWITCH BYTES IN MSHW
028AR  9862               274        WHR     6,2              OUTPUT MSHW
028CR  9422               275        EXBR    2,2              RETURN BYTES TO NORMAL
028ER  9411               276        EXBR    1,1              SWITCH BYTES IN OVERFLOW HW
0290R  9861               277        WHR     6,1              OUTPUT OVERFLOW HW
0292R  9411               278        EXBR    1,1              RETURN BYTES TO NORMAL
0294R  4300 0022R         279        B       START            RETURN TO START
```

LAMBDA METER PROGRAM

BINARY TO DECIMAL ROUTINE

```
                          281  *THIS SUBROUTINE WILL CONVERT BETWEEN A 32 BIT SIGNED BINARY
                          282  *NUMBER AND A 10 DIGIT DECIMAL NUMBER
                          283  *THE DECIMAL NUMBER IS RIGHT JUSTIFIED IN R1-R3 WITH THE SIGN BIT
                          284  *THE MSB OF R1
                          285  *THE BINARY NUMBER IS RIGHT JUSTIFIED IN R4-R5
                          286  *R11 CONTAINS THE SUBROUTINE RETURN ADDRESS
                          287  *ALL REGISTERS EXCEPT R0 AND THE ANSWER ARE RESTORED ON RETURN
                          288  *IF THE DECIMAL NUMBER IS OUTSIDE THE RANGE +-2^31, THE BINARY
                          289  *NUMBER IS SET TO FFFFFFFF
0298R  D040 155CR         290  BTOD  STM     4,REGSAV+8       SAVE REGISTERS
029CR  0711               291        XHR     1,1              CLEAR R1 FOR SIGN
029ER  0844               292        LHR     4,4              CHECK R4 FOR POLARITY
02A0R  4310 02B2R         293        BNM     PLS              COMPLEMENT IF NEG
02A4R  2521               294        LCS     2,1              LOAD FFFF INTO R2
02A6R  0742               295        XHR     4,2              COMPLEMENT
```

```
02A8R  0752          296          XHR    5,2
02AAR  2651          297          AIS    5,1
02ACR  0E41          298          ACHR   4,1
02AER  C810 8000     299          LHI    1,X'8000'        SET SIGN IN R1
02B2R  249A          300   PLS    LIS    9,10             LOAD 10 INTO R9
02B4R  C8C0 02D0R    301          LHI    12,DIVSUB        LOAD DIVSUB ADR INTO R12
02B8R  24A8          302          LIS    10,8             LOAD DIGIT COUNT INTO R10
02BAR  01DC          303          BALR   13,12            CALL DIVSUB
02BCR  402E          304          LHR    2,14             LOAD D3-D10 INTO R2-R3
02BER  083F          305          LHR    3,15
02C0R  24A2          306          LIS    10,2             LOAD DIGIT COUNT INTO R10
02C2R  01DC          307          BALR   13,12            CALL DIVSUB
02C4R  ECE0 0018     308          SRL    14,24            RIGHT JUST DIGITS
02C8R  0A1F          309          AHR    1,15             COMBINE D1-D2 WITH SIGN BIT
02CAR  D140 155CR    310          LM     4,REGSAV+8       RESTORE REGISTERS
02CER  03B0          311          BR     11               RETURN
```

LAMBDA METER PROGRAM

DIVIDE-BY-10 ROUTINE

```
02D0R  0788          313   DIVSUB XHR    8,8              CLEAR R8 FOR Q2
02D2R  0874          314          LHR    7,4              LOAD MSH INTO R7
02D4R  4330 02F4R    315          BZ     SHORT            IF ZERO, GO TO SHORT
02D8R  0766          316          XHR    6,6              CLEAR R6
02DAR  0D69          317          DHR    6,9              DIV MSH BY 10, RM1 IN R6, Q1 IN R7
02DCR  0846          318          LHR    4,6              RM1 INTO R4
02DER  ED40 0001     319          SLL    4,1              IDVDND INTO R4
02E2R  C540 000A     320          CLHI   4,10             COMPARE IDVDND WITH 10
02E6R  4280 02F0R    321          BL     LS               IF IDVDND<10, GO TO LS
02EAR  C880 8000     322          LHI    8,X'8000'        SET Q2=1
02EER  0B49          323          SHR    4,9              IDVDND-10=RM2
02F0R  EC40 0001     324   LS     SRL    4,1              COMBINE RM2 AND LSH-MSB
02F4R  0D49          325   SHORT  DHR    4,9              DIVIDE BY 10, RM3 IN R4, Q3 IN R5
02F6R  914C          326          SLLS   4,12             LEFT JUST DIGIT
02F8R  ECE0 0004     327          SRL    14,4             SHIFT PREC DIGITS 1 PLACE RIGHT
02FCR  0AE4          328          AHR    14,4             INSERT NEW DIGIT
02FER  0A58          329          AHR    5,8              COMBINE Q2 &Q3
0300R  0847          330          LHR    4,7              Q1 INTO R4
0302R  27A1          331          SIS    10,1             DECREMENT DIGIT COUNTER
0304R  033D          332          BZR    13               RETURN IF DONE
0306R  4300 02D0R    333          B      DIVSUB           OR RETURN FOR NEXT DIGIT
```

LAMBDA METER PROGRAM

DECIMAL TO BINARY ROUTINE

```
030AR  D060 1560R    335   DTOB   STM    6,REGSAV+12      SAVE REGISTERS
030ER  249A          336          LIS    9,10             LOAD 10 FOR MULT INTO R9
0310R  0744          337          XHR    4,4              CLEAR OUTPUT REGISTERS
0312R  0755          338          XHR    5,5
0314R  C8C0 035AR    339          LHI    12,MULSUB        ADR OF MULSUB INTO R12
0318R  08A1          340          LHR    10,1             SAVE FIRST HALFWORD
031AR  ED00 0008     341          SLL    0,8              LEFT JUST D1,D2 IN R1
031ER  2472          342          LIS    7,2              LOAD DIGIT COUNT INTO R7
0320R  01DC          343          BALR   13,12            CALL MULSUB
0322R  2474          344          LIS    7,4              LOAD DIGIT COUNT INTO R7
0324R  0912          345          LHR    1,2              LOAD D3-D6 INTO R1
0326R  01DC          346          BALR   13,12            CALL MULSUB
0328R  2474          347          LIS    7,4              LOAD DIGIT COUNT INTO R7
032AR  0813          348          LHR    1,3              LOAD D7-D10 INTO R1
032CR  01DC          349          BALR   13,12            CALL MULSUB
032ER  0844          350          LHR    4,4              CHECK MAGN OF RESULT
0330R  4210 0352R    351          BM     OVFLW            IF TOO LARGE, GO TO OVFLW
0334R  08EE          352          LHR    14,14            CHECK R15 FOR OVFLW
033CR  4230 0352R    353          BNZ    OVFLW            GO TO OVFLW IF NOT ZERO
033AR  081A          354          LHR    1,10             CHECK POLARITY
033CR  4310 034CR    355          BNM    FIN              IF POS, GO TO FIN
0340R  2571          356          LCS    7,1              LOAD FFFF INTO R7
0342R  0788          357          XHR    8,8              CLEAR R8
0344R  0747          358          XHR    4,7              COMPLEMENT RESULT
0346R  0757          359          XHR    5,7
0348R  2651          360          AIS    5,1
034AR  0E48          361          ACHR   4,8
034CR  D160 1560R    362   FIN    LM     6,REGSAV+12      RESTORE REGISTERS
0350R  030B          363          BR     11               RETURN
0352R  2541          364   OVFLW  LCS    4,1              LOAD FFFF INTO R4
0354R  0854          365          LHR    5,4              LOAD FFFF INTO R5
0356R  4300 034CR    366          B      FIN              RETURN
```

LAMBDA METER PROGRAM

MULTIPLY-BY-10 ROUTINE

```
035AR  0700              368  MULSUB  XHR   0,0            CLEAR R0
035CR  ED00 0004         369          SLL   0,4            SHIFT NEXT DIGIT INTO R0
0360R  03F4              370          LHR   15,4           LOAD MSHW INTO R15
0362R  9C49              371          MHUR  4,9            MULT LSHW BY 10, INTO R4-R5
0364R  9CE9              372          MHUR  14,9           MULT MSHW BY 10, INTO R14-R15
036ER  0A50              373          AHR   5,0            ADD NEXT DIGIT
036BR  0E4F              374          ACHR  4,15           COMBINE, RESULT INTO R4-R5
036AR  2771              375          SIS   7,1            DECREMENT DIGIT COUNTER
036CR  033D              376          BZR   13             RETURN IF DONE
036ER  4300 035AR        377          B     MULSUB         OR GET NEXT DIGIT
                         379          CROSS
                         380  *
                         381  * FULL WORD - UNSIGNED DIVIDE
                         382  *
                         383  * WRITTEN BY BILL HALL, NBS BOULDER
                         384  *
                         385  *
                         386  * UPON ENTRY (USUALLY BAL 0,USDVD)
                         387  *  REGS CONTAIN
                         388  *     0 RETURN ADDRESS
                         389  * 6 & 7 DIVIDEND
                         390  * 8 & 9 DIVISOR
                         391  *
                         392  * UPON RETURN FROM SUBROUTINE
                         393  *  REGS CONTAIN
                         394  * 0 - 5 ENTRY VALUES (UNCHANGED)
                         395  * 13-15 ENTRY VALUES (UNCHANGED)
                         396  * 6 & 7 REMAINDER
                         397  * 8 & 9 DIVISOR
                         398  * 10&11 QUOTIENT
                         399  *    12 ZERO
                         400  *
                         401  * IF THE DIVISOR IS ZERO, CARRY AND ALL QUOTIENT BITS ARE SET
                         402  *
0372R  07AA              403  USDVD   XHR   10,10          ZERO THE QUOTIENT
0374R  07BB              404          XHR   11,11
0376R  24C1              405          LIS   12,1           SET THE SHIFT COUNT
0378R  0888              406          LHR   8,8
037AR  211A              407  UPSHFT  BMS   DVD            NORMALIZE DIVISOR
037CR  26C1              408          AIS   12,1
037ER  ED80 0001         409          SLL   8,1
0382R  2034              410          BNZS  UPSHFT
0384R  25B1              411          LCS   11,1           DIVISOR IS ZERO, SET ALL BITS
0386R  25A1              412          LCS   10,1
0388R  CEA0 0001         413          SRHA  10,1           SET CARRY
038CR  0300              414          BR    0
038ER  EDA0 0001         415  DVD     SLL   10,1           PERFORM LONG DIVISION
0392R  0879              416          SHR   7,9
```

MULTIPLY-BY-10 ROUTINE

```
0394R  0F68              417          SCHR  6,8
0396R  2187              418          BCS   NOBIT          WILL DIVISOR GO?
0398R  26B1              419          AIS   11,1           YES, UP THE QUOTIENT
039AR  27C1              420  DNSHFT  SIS   12,1           DONE?
039CR  0330              421          BZR   0
039ER  EC80 0001         422          SRL   8,1            SHIFT DIVISOR AND GO AGAIN
03A2R  220A              423          BS    DVD
03A4R  0A79              424  NOBIT   AHR   7,9            DIVISOR TOO BIG, ADD IT BACK
03A6R  0E68              425          ACHR  6,8
03A8R  2207              426          BS    DNSHFT
03AAR  4CE1              427  A2      DCX   4CE1
03ACR                    428  L0      DSH   4
03B4R                    429  SCALE   DSH   2
03B8R                    430  DATA    DSH   2048
13B8R                    431  RSLT1   DSH   64
1438R                    432  RSLT2   DSH   64
14B8R                    433  POS     DSH   64
1538R                    434  SUM1    DSH   2
153CR                    435  SUM2    DSH   2
1540R                    436  LL0     DSH   2
1544R                    437  L       DSH   2
1548R                    438  N0      DSH   2
154CR                    439  N1      DSH   2
1550R                    440  LAMBDA  DSH   2
1554R                    441  REGSAV  DSH   16
1574R                    442          END
```

I claim:

1. Apparatus for measuring to very high resolution the wavelength of a beam of radiation incident thereon, comprising:
    (a) a pair of plain glass flats spaced a substantial distance apart and enclosing a small angle to provide a high-order, multi-fringe Fizeau interferometer, said interferometer stationary during said wavelength measurement;
    (b) means for establishing an origin optical path of known length between said flats;
    (c) high-resolution photoelectric means for detecting the fringes produced by said interferometer and providing electrical signals corresponding thereto; and
    (d) data processing means receiving said electrical signals for:
        (i) determining to high resolution the average spacing between said detected fringes and computing therefrom to high resolution the wavelength of said incident radiation;
        (ii) determining to high resolution the optical path length between said flats at a fringe near said original path;
        (iii) computing from said high-resolution wavelength and said high-resolution optical path length a high-resolution measure of the order number of said high-order interferometer;
        (iv) rounding to the nearest integer said computed measure of said order number; and
        (v) computing from said integer order number said very high-resolution measurement of said incident wavelength.

2. Apparatus as recited in claim 1 further comprising means for directing a reflected fringe pattern from said interferometer onto said photoelectric means.

3. Apparatus as recited in claim 2 wherein said photoelectric means comprises a linear array of photodiode elements.

4. Apparatus as recited in claim 1 wherein said flat surfaces are disk-shaped and spaced apart by means of low-expansion spacers.

5. Apparatus as recited in claim 4 wherein said spacers define a gap between said flat surfaces of approximately one millimeter.

6. Apparatus as recited in claim 1 wherein said data processing means comprises programmable digital data processing means, said electrical signals are analog electrical signals and said apparatus further comprises analog-to-digital converting means connected between said photoelectric means and said data processing means.

7. Apparatus as recited in claim 1 further comprising:
    (a) an objective lens positioned to receive said beam prior to incidence onto said interferometer;
    (b) a spatial filter positioned at the focus of said objective lens and toward said interferometer; and
    (c) a collimating lens positioned for collimating the beam from the spatial filter onto said interferometer.

8. Apparatus as recited in claim 1 wherein said angle is approximately 20 seconds of arc.

9. Apparatus as recited in claim 1 wherein said beam is a coherent light beam.

10. Apparatus as recited in claim 1 wherein said means for establishing an original optical path comprises means for passing a reference beam of known wavelength through said interferometer.

11. Apparatus as recited in claim 10 wherein said means for establishing an origin optical path further comprises a pair of optical marks fixed in position relative to said interferometer for establishing an origin with respect to said fringes.

12. Apparatus for measuring the wavelength of a substantially monochromatic light beam to a very high accuracy on the order of a few parts per $10^8$ and comprising:
    (a) a pair of plain glass flats positioned for enclosing a small angle to provide a high-order, multi-fringe Fizeau interferometer, said Fizeau interferometer producing a periodic interference pattern in a fixed position during said wavelength measurement;
    (b) photoelectric receiving means positioned to receive a plurality of interference fringes of said interference pattern for producing electrical signals corresponding thereto;
    (c) means for measuring a reference optical path length through said interferometer for calibrating said apparatus, including:
        (i) means for directing a substantially monochromatic reference beam of known wavelength through said interferometer to produce a reference interference pattern;
        (ii) means for directing said reference interference pattern onto said photoelectric receiving means; and
        (iii) means for generating reference electrical signals corresponding to said reference interference pattern;
    (d) electrical data processing means for receiving said electrical signals and said reference electrical signals, said data processing means programmed for:
        (i) calculating said reference optical path length from said reference electrical signals;
        (ii) determining from said electrical signals a measure of the spacing between said plurality of fringes for providing an initial measure of said wavelength;
        (iii) determining the optical path length between said flats at a fringe near said reference optical path;
        (iv) dividing said determined optical path length by said initial measure of said wavelength;
        (v) rounding off the result of the division to the nearest integral number to provide a measure of the order number of said interferometer; and
        (vi) computing from said integral order number said wavelength value of very high accuracy; and
    (e) output means connected to said data processing means for providing an output corresponding to said calculated wavelength from said data processing means thereby providing a very high accuracy measure of said wavelength.

13. A method of measuring the wavelength of a substantially monochromatic light beam comprising the steps of:
    (a) directing said light beam through a stationary Fizeau-type interferometer to provide an interference pattern having a plurality of minimum and maximum light intensity fringes;
    (b) directing said interference pattern to a photoelectric receiving device;
    (c) generating electronic signals in said photoelectric receiving device corresponding to said interference pattern;

(d) determining from said electronic signals the fringe spacing of said interference pattern;
(e) determining from said electronic signals the position of a predetermined intensity fringe of said interference pattern from a coordinate origin;
(f) calibrating said interferometer by:
  (i) directing a substantially monochromatic reference beam of known wavelength through said interferometer to provide a reference interference pattern;
  (ii) directing said reference interference pattern onto said photoelectric receiving device;
  (iii) generating electronic signals in said photoelectric receiving device corresponding to said interference pattern;
  (iv) determining from said electronic signal the position of a given intensity fringe of said reference interference pattern from said coordinate origin;
  (v) calculating from said determined position and known reference wavelength of said reference beam the optical path difference through said interferometer at said origin;
(g) determining from said calculated optical path difference of said reference interference pattern and the determined position of said predetermined intensity fringe, the optical path difference at the position of said predetermined intensity fringe; and
(h) calculating the wavelength of said light beam from said determined fringe spacing and said determined optical path difference.

* * * * *